(12) United States Patent
Liang et al.

(10) Patent No.: US 8,985,590 B2
(45) Date of Patent: *Mar. 24, 2015

(54) SEAL ASSEMBLY FOR TRACK PIN JOINT ASSEMBLY OF UNDERCARRIAGE

(75) Inventors: Guanghui Liang, Dunlap, IL (US); Mark Diekevers, Metamora, IL (US); Mark Kiesel, Peoria, IL (US); Eric Johannsen, Washington, IL (US); Jason Sebright, Chillicothe, IL (US)

(73) Assignee: Caterpillar, Peoria, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/451,195

(22) Filed: Apr. 19, 2012

(65) Prior Publication Data

US 2012/0267859 A1 Oct. 25, 2012

Related U.S. Application Data

(60) Provisional application No. 61/478,210, filed on Apr. 22, 2011.

(51) Int. Cl.
| | |
|---|---|
| *F16J 15/00* | (2006.01) |
| *B62D 55/21* | (2006.01) |
| *B62D 55/088* | (2006.01) |

(52) U.S. Cl.
CPC .......... *B62D 55/0887* (2013.01); *B62D 55/211* (2013.01)
USPC ............................ 277/589; 277/553; 277/549

(58) Field of Classification Search
USPC .................................. 277/549, 553, 556, 589
See application file for complete search history.

(56) References Cited

U.S. PATENT DOCUMENTS

| | | | | |
|---|---|---|---|---|
| 3,149,849 | A | * | 9/1964 | Baldridge ...................... 277/589 |
| 3,885,800 | A | * | 5/1975 | Sievenpiper .................. 277/468 |
| 4,087,100 | A | | 5/1978 | Yoshihashi et al. |
| 4,094,516 | A | | 6/1978 | Morley et al. |
| 4,262,914 | A | * | 4/1981 | Roley ............................ 277/381 |
| 4,469,336 | A | | 9/1984 | Linne |
| 4,819,999 | A | | 4/1989 | Livesay et al. |

(Continued)

FOREIGN PATENT DOCUMENTS

WO 2008/093160 8/2008

OTHER PUBLICATIONS

"D5K Track-Type Tractor," Caterpillar product brochure (2009).

(Continued)

*Primary Examiner* — Gilbert Lee
(74) *Attorney, Agent, or Firm* — Leydig, Voit & Mayer, Ltd.

(57) ABSTRACT

A seal assembly can be incorporated into a track pin cartridge assembly of an undercarriage of a track-type machine. The seal assembly can include a pin defining a longitudinal axis and first and second members both coaxial with the pin about the longitudinal axis. The first member is pivotable about the longitudinal axis with respect to the second member and includes a load ring engagement surface defining a seal cavity disposed in proximal relationship to the second member. A seal assembly, including a seal ring and a load ring, is disposed in the seal cavity and sealingly engages the first and second members. A radial segment of a first member engagement surface of the load ring is radially offset, measured along a radial axis perpendicular to the longitudinal axis, from a radial segment of a seal ring engagement surface of the load ring.

20 Claims, 7 Drawing Sheets

(56) References Cited

U.S. PATENT DOCUMENTS

| | | | |
|---|---|---|---|
| 5,143,382 A * | 9/1992 | Maringer | 277/584 |
| 5,542,701 A | 8/1996 | Rion | |
| 5,794,940 A | 8/1998 | Brueggmann | |
| 5,826,884 A | 10/1998 | Anderton et al. | |
| 5,899,459 A | 5/1999 | Watts | |
| 6,102,408 A | 8/2000 | Anderton et al. | |
| 6,105,969 A | 8/2000 | Anderton et al. | |
| 6,382,742 B1 | 5/2002 | Hasselbusch et al. | |
| 6,386,651 B1 | 5/2002 | Gerardin et al. | |
| 6,454,366 B1 | 9/2002 | Egle | |
| 6,478,388 B2 | 11/2002 | Maguire | |
| 6,739,680 B2 | 5/2004 | Hasselbusch et al. | |
| 7,296,800 B2 | 11/2007 | Tsuboi et al. | |
| 7,347,513 B2 | 3/2008 | Johannsen et al. | |
| 2002/0117075 A1 | 8/2002 | Maguire | |
| 2004/0032166 A1 | 2/2004 | Maguire et al. | |
| 2004/0036353 A1 | 2/2004 | Hasselbusch et al. | |
| 2004/0119245 A1 | 6/2004 | Thomas et al. | |
| 2005/0040708 A1 | 2/2005 | Yamamoto et al. | |
| 2005/0110219 A1 | 5/2005 | Tsuboi et al. | |
| 2006/0022411 A1 | 2/2006 | Beardsley et al. | |
| 2006/0049692 A1 | 3/2006 | Livesay et al. | |
| 2006/0158034 A1 | 7/2006 | Standish et al. | |
| 2006/0163217 A1 | 7/2006 | Jiang et al. | |
| 2006/0284485 A1 | 12/2006 | Johannsen et al. | |
| 2007/0267390 A1 | 11/2007 | Jiang et al. | |
| 2007/0267821 A1 | 11/2007 | Vom Stein et al. | |
| 2008/0102291 A1 | 5/2008 | Hattiangadi et al. | |
| 2008/0164756 A1 | 7/2008 | Yamamoto et al. | |
| 2008/0231110 A1 | 9/2008 | Mulligan et al. | |
| 2008/0265667 A1 | 10/2008 | Livesay | |
| 2009/0102281 A1 | 4/2009 | Diekevers et al. | |
| 2009/0108541 A1 | 4/2009 | Beardsley et al. | |
| 2009/0110472 A1 | 4/2009 | Liang et al. | |
| 2009/0243384 A1 | 10/2009 | Diekevers et al. | |
| 2010/0052418 A1 | 3/2010 | Angot | |
| 2010/0133898 A1 | 6/2010 | Johannsen et al. | |
| 2010/0139993 A1 | 6/2010 | Sebright et al. | |
| 2010/0141027 A1 | 6/2010 | Fischer et al. | |
| 2010/0146925 A1 | 6/2010 | Johannsen et al. | |
| 2010/0148572 A1 | 6/2010 | Vom Stein | |
| 2010/0148575 A1 | 6/2010 | Johannsen et al. | |
| 2010/0154734 A1 | 6/2010 | Sebright et al. | |
| 2010/0156169 A1 | 6/2010 | Angot et al. | |
| 2011/0006597 A1 | 1/2011 | Diekevers et al. | |

OTHER PUBLICATIONS

"D6R Series II Track-Type Tractor," Caterpillar product brochure (2005).

"D6R Series III Track-Type Tractor," Caterpillar product brochure (2005).

"A Complete Guide to Caterpillar Undercarriage Systems," Caterpillar product brochure (2008).

"Caterpillar Dozer Undercarriage & Excavator Undercarriage Systems," retrieved from URL:http://www.cat.com/cda/layout?m=4016O&x=7&f=322205 (Feb. 1, 2011).

* cited by examiner

SEAL ASSEMBLY FOR TRACK PIN JOINT ASSEMBLY OF UNDERCARRIAGE

CROSS-REFERENCE TO RELATED APPLICATION

This patent application claims the benefit of priority to U.S. Provisional Patent Application No. 61/478,210, filed Apr. 22, 2011, and entitled "Seal Assembly For Track Pin Joint Assembly of Undercarriage," which is incorporated in its entirety herein by this reference.

TECHNICAL FIELD

This patent disclosure relates generally to an undercarriage for a track-type machine and, more particularly, to a seal assembly for use in a track pin joint assembly of the undercarriage.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as the environments identified above. Specifically, rather than rolling across a work surface on wheels, track-type machines utilize one or more track assemblies that include an endless loop of coupled track links defining exterior surfaces, which support ground-engaging track shoes, and interior surfaces that travel about one or more rotatable track-engaging elements, such as, drive sprockets, idlers, tensioners, and rollers, for example.

Typical track chain assembly designs include a track pin either rotatably or fixed to a pair of chain links and a bushing rotatably positioned between the links and about the track pin. Such track chain assemblies can operate in extremely adverse environments in which track joints may be exposed to various abrasive mixtures of water, dirt, sand, rock or other mineral or chemical elements.

Consequently, seal assemblies are placed in the track joints to exclude contaminants and retain lubricant within the track joint to facilitate the aforementioned relative movement of the bushings and the track links during use. A common type of seal used in track chains is referred to as a "can" seal. A can seal often includes a "lip" supported by a can and a load ring engaging the can.

These designs have included a variety of seal configurations and positions such as against an inside face of the link or against the track bushing. For example, U.S. Pat. No. 6,739,680 for a "Cartridge Assembly for a Track Chain," issued May 25, 2004, to Hasselbusch et al. is directed to a cartridge assembly for a track chain assembly which includes a bushing rotatably positioned about a track pin. Bearing members are positioned about the track pin adjacent the bushing. Collars are positioned about the track pin adjacent the bearing members. Seal arrangements are positioned between the collars and the bearing members and between the bearing members and the track bushing sealably excluding contaminants and the retention of a lubricating fluid from a passage in the bushing and a bore within the track pin.

One cause of failure of current seals is known in the art as "heel under." Heel under describes the situation where debris is ingested between an outer surface of a load ring of the seal assembly and the seal cavity within which the seal assembly is housed. The debris builds up and can cause the load ring to rotate or move out of position against a seal ring resulting in the failure of the seal and leakage of lubricant.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a seal assembly adapted for use in sealing a joint having a first member pivotable about a rotational axis relative to a second member thereof. The first member includes a load ring engagement surface defining, at least in part, an axially-extending seal cavity about the rotational axis. The seal assembly includes a seal ring and a load ring. The seal ring includes an axial flange extending along the rotational axis and a radial flange extending along a radial axis perpendicular to the rotational axis. The load ring includes a seal ring engagement surface, a first member engagement surface, an inner relief surface, and an outer relief surface.

The seal ring engagement surface includes a radial segment in proximate relationship with the radial flange of the seal ring and an axial segment in proximate relationship with the axial flange of the seal ring. The first member engagement surface includes a radial segment and an axial segment. The radial segment of the first member engagement surface is in distal relationship with the radial segment of the seal ring engagement surface. The inner relief surface extends between the radial segment of the first member engagement surface and the axial segment of the seal ring engagement surface. The outer relief surface extends between the axial segment of the first member engagement surface and the radial segment of the seal ring engagement surface. The radial segment of the first member engagement surface is radially offset, measured along the radial axis, from the radial segment of the seal ring engagement surface.

In another embodiment, a track pin cartridge assembly is disclosed that includes a track pin, a first member, a second member, and a seal assembly. The track pin defines a longitudinal axis. The first member and the second member are both coaxial with the pin about the longitudinal axis. The first member is pivotable about the longitudinal axis with respect to the second member. The first member includes a load ring engagement surface defining, at least in part, an axially-extending seal cavity disposed in proximal relationship to the second member. The seal assembly is disposed in the seal cavity and sealingly engages the first member and the second member.

The seal assembly includes a seal ring and a load ring. The seal ring includes an axial flange extending along the longitudinal axis and a radial flange extending along a radial axis perpendicular to the longitudinal axis. The load ring includes a seal ring engagement surface, a first member engagement surface, an inner relief surface, and an outer relief surface.

The seal ring engagement surface includes a radial segment in proximate relationship with the radial flange of the seal ring and an axial segment in proximate relationship with the axial flange of the seal ring. The first member engagement surface engages the load ring engagement surface of the first member. The first member engagement surface includes a radial segment and an axial segment. The radial segment of the first member engagement surface is in distal relationship with the radial segment of the seal ring engagement surface. The inner relief surface extends between the radial segment of the first member engagement surface and the axial segment of the seal ring engagement surface. The outer relief surface extends between the axial segment of the first member engagement surface and the radial segment of the seal ring engagement surface. The radial segment of the first member engagement surface is radially offset, measured along the radial axis, from the radial segment of the seal ring engagement surface.

In yet another embodiment, an undercarriage assembly is described that includes a track pin, a first link assembly, a second link assembly, and a seal assembly. The track pin defines a longitudinal axis. The first link assembly and the second link assembly are mounted to the track pin such that the first and second link assemblies are rotatable with respect to each other about the longitudinal axis of the track pin. At least one of the first and second link assemblies comprises a first member having a load ring engagement surface which defines, at least in part, a seal cavity disposed between the first link assembly and the second link assembly. The seal assembly is disposed in the seal cavity and sealingly engages the first link assembly and the second link assembly.

The seal assembly includes a seal ring and a load ring. The seal ring includes an axial flange extending along the longitudinal axis and a radial flange extending along a radial axis perpendicular to the longitudinal axis. The load ring includes a seal ring engagement surface, a first member engagement surface, an inner relief surface, and an outer relief surface.

The seal ring engagement surface includes a radial segment in proximate relationship with the radial flange of the seal ring and an axial segment in proximate relationship with the axial flange of the seal ring. The first member engagement surface engages the load ring engagement surface of the first member. The first member engagement surface includes a radial segment and an axial segment. The radial segment of the first member engagement surface is in distal relationship with the radial segment of the seal ring engagement surface. The inner relief surface extends between the radial segment of the first member engagement surface and the axial segment of the seal ring engagement surface. The outer relief surface extends between the axial segment of the first member engagement surface and the radial segment of the seal ring engagement surface. The radial segment of the first member engagement surface is radially offset, measured along the radial axis, from the radial segment of the seal ring engagement surface.

Further and alternative aspects and features of the disclosed principles will be appreciated from the following detailed description and the accompanying drawings. As will be appreciated, the principles related to track seal assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

The present disclosure provides a seal assembly for a track chain pin joint assembly of an undercarriage of a track-type machine. In some embodiments, the pin joint assembly can comprise a track pin cartridge assembly. Examples of such machines include machines used for construction, mining, forestry, and other similar industries. In some embodiments, the machine can be a dozer, loader, or excavator, or any other on-highway or off-highway vehicle having a track-type undercarriage with first and second track assemblies on opposing sides thereof. The track assemblies can be adapted to engage the ground, or other surface, to propel the track-type machine.

Figure 1:
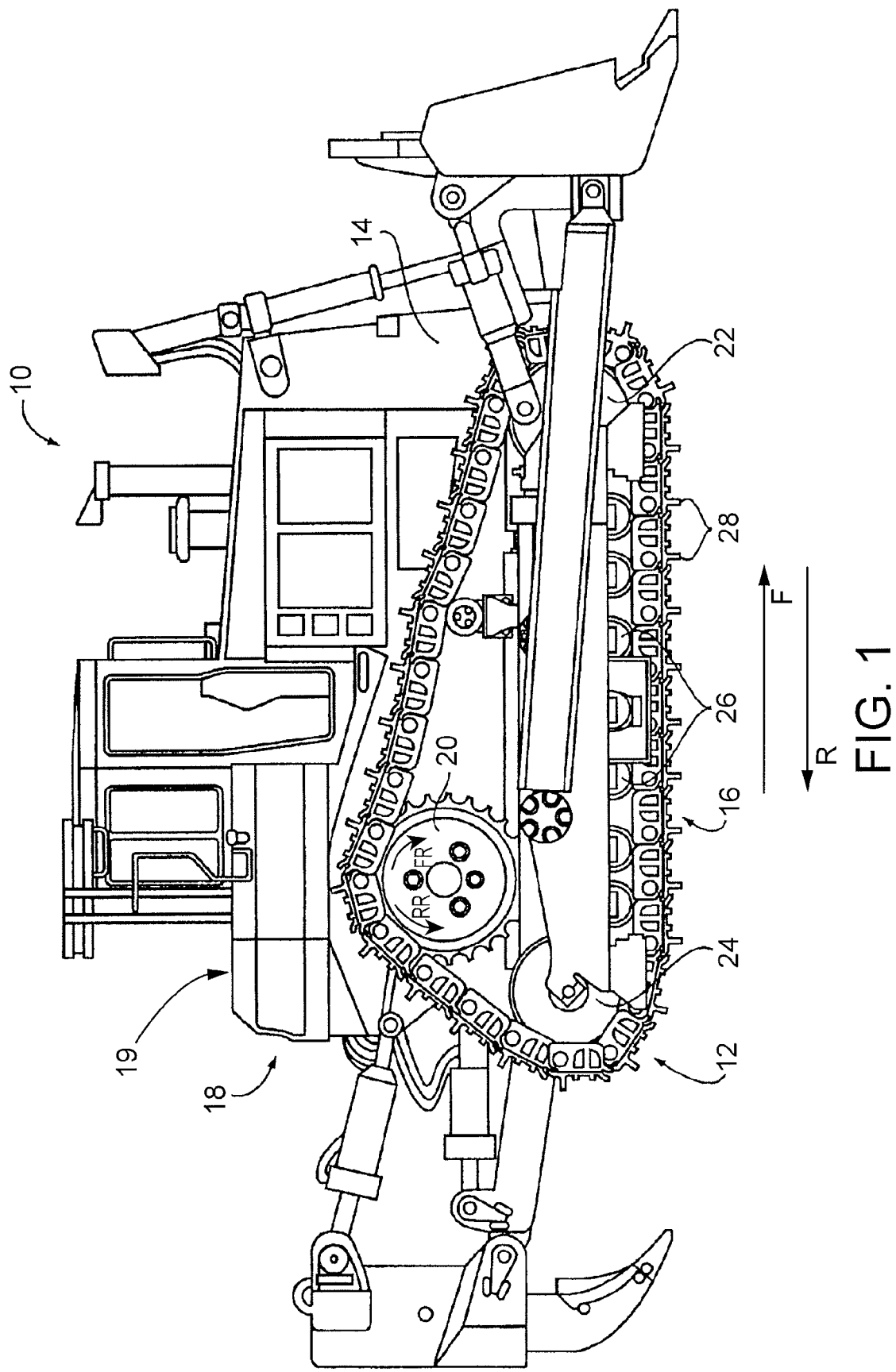
FIG. 1 is a diagrammatic side elevational view of an embodiment of a track-type machine.

Turning now to the Figures, there is shown in FIG. 1 an exemplary embodiment of a machine 10 with a track-type undercarriage 12. The machine 10 may also be referenced herein as a track-type machine. In different embodiments, the machine 10 may be a dozer, loader, or excavator, or any other on-highway or off-highway vehicle.

The machine 10 includes a frame 14 having a first track chain assembly 16 disposed on a first side 18 thereof, and a second track chain assembly (not shown) disposed on a second side 19 thereof. The second side 19 is in opposing relationship to the first side 18. Together, the track assemblies are adapted to engage the ground, or other surface, to propel the machine 10.

It should be appreciated that the track assemblies of machine 10 may be similar and, further, may represent mirror images of one another. As such, only the first track chain assembly 16 will be described herein, and it should be understood that the description of the first track chain assembly 16 is applicable to the second track chain assembly, as well.

The first track chain assembly 16 extends about a plurality of rolling elements such as a drive sprocket 20, a front idler 22, a rear idler 24, and a plurality of track rollers 26. The track chain assembly 16 includes a plurality of ground-engaging track shoes 28 for engaging the ground, or other surface, and propelling the machine 10.

During typical operation of the undercarriage 12, the drive sprocket 20 is driven in a forward rotational direction "FR" to drive the track chain assembly 16, and thus the machine 10, in a forward direction "F," and in a reverse rotational direction "RR" to drive the track chain assembly 16, and thus the machine 10, in a reverse direction "R." The drive sprockets 20 of the undercarriage 12 can be independently operated to allow the machine 10 to turn.

While the machine 10 is illustrated in the context of a track-type machine, it should be appreciated that the present disclosure is not thereby limited, and that a wide variety of other machines having tracks are also contemplated within the present context. For example, in other embodiments, the track chain assembly 16 can be included in a conveyor system, as a track for transmitting torque between rotating elements, or in any other application known to those skilled in the art.

Figure 2:
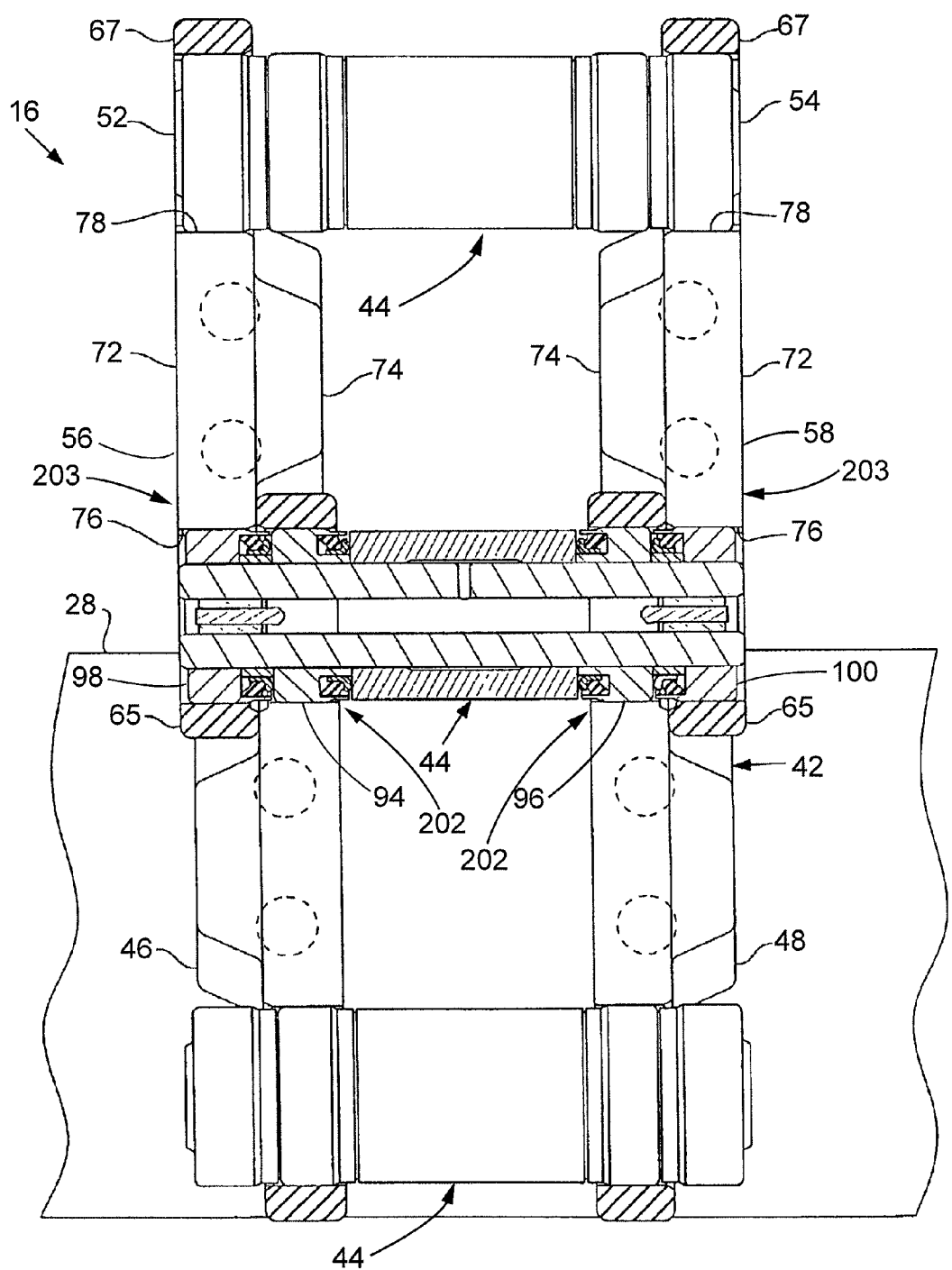
FIG. 2 is a top plan view of a portion of an embodiment of a track chain assembly constructed in accordance with principles of the present disclosure.

Referring now to FIG. 2, the first track chain assembly 16, only a portion of which is shown, includes a plurality of subassemblies 42. Each subassembly 42 includes a track pin cartridge assembly 44, an inner link 46, an outer link 48, and a track shoe 28 connected to the inner and outer links 46, 48. A number of subassemblies 42 are mechanically coupled to adjacent subassemblies 42 so that, when an appropriate number of these subassemblies 42 are connected together, the track chain assembly 16 is formed. The first track chain assembly 16 has a predetermined length for a given application with opposite ends that are capable of being connected together to form a closed loop. The closed loop is formed by mechanically coupling the opposite ends together with an inner master link 52 and outer master link 54 to respectively provide an inner chain 56 of a series of inner links 46 and an outer chain 58 of a series of outer links 48 coupled together via a plurality of track pin cartridge assemblies 44.

It should be recognized that the terms inner and outer, in reference to the links 46, 48 of each subassembly 42 and the master links 52, 54, in this example are used merely as descriptors for the orientation shown in the Figures. Other terms such as left, right and first, second could be interchangeably used as well. It should be understood that these terms are merely convenient labels applied to the different views and are not meant to be limiting in any way.

Figure 3:
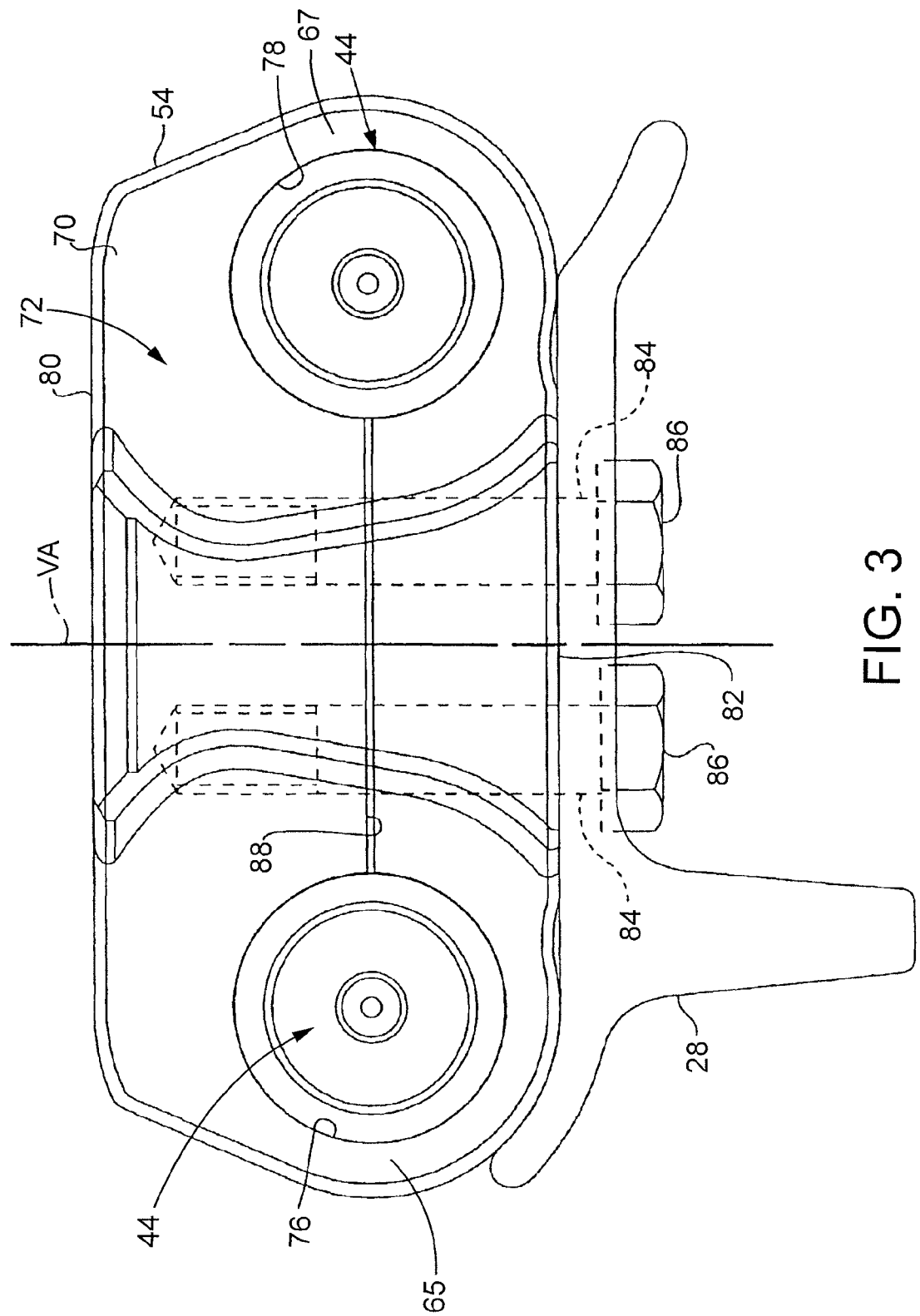
FIG. 3 is a side elevational view of a master link of the track chain assembly of FIG. 2.

Referring now to FIGS. 2 and 3, the inner and outer links 46, 48 and the inner and outer master links 52, 54 in this embodiment are shown as being straight links each having a first end portion 65 and a second end portion 67. The inner master link 52 is identical to the outer master link 54. Therefore, only the outer master link 54 will be described in detail. It should be understood that the description of the outer master link 54 is applicable to the inner master link 52.

The outer master link 54 includes a body portion 70 with a first side 72 and a second side 74 in opposing relationship to the first side 72. A first aperture 76 extends through the first end portion 65. A second aperture 78 extends through the second end portion 67. The body portion 70 also includes a rail surface 80 and a shoe surface 82. An apertures 84 is positioned on both sides of, and a predetermined distance from, a central vertical axis "VA." Each aperture 84 is laterally centered with respect to the widest portion of body portion 70. A fastener 86 is positioned in each aperture 84 to secure the track shoe 28 to the shoe surface 82 of the outer master link 54. Any number of different varieties of track shoes can be used in other embodiments.

The body portion 70 of the outer master link 54 includes a relief channel 88 extending substantially perpendicularly relative to the central vertical axis "VA" between the first aperture 76 and the second aperture 78. The relief channel 88 extends through the body portion 70 from the first side 72 to the second side 74 thereof. As the fasteners 86 are tightened to secure the track shoe 28 to the outer master link 54, the portions of the body portion 70 defining the height of the relief channel 88, measured along the vertical axis "VA" are drawn together, effectively reducing the diameter of the first and second apertures 76, 78. Thus, the master link 54 retentively engages the track pin cartridge assemblies 44 respectively disposed in the first aperture 76 and the second aperture 78 upon sufficiently reducing the diameters of the first and second apertures 76, 78 through the use of the fasteners 86. In some embodiments, the inner and outer links 46, 48 can have a construction that is similar to that of the outer master link 54.

Figure 4:
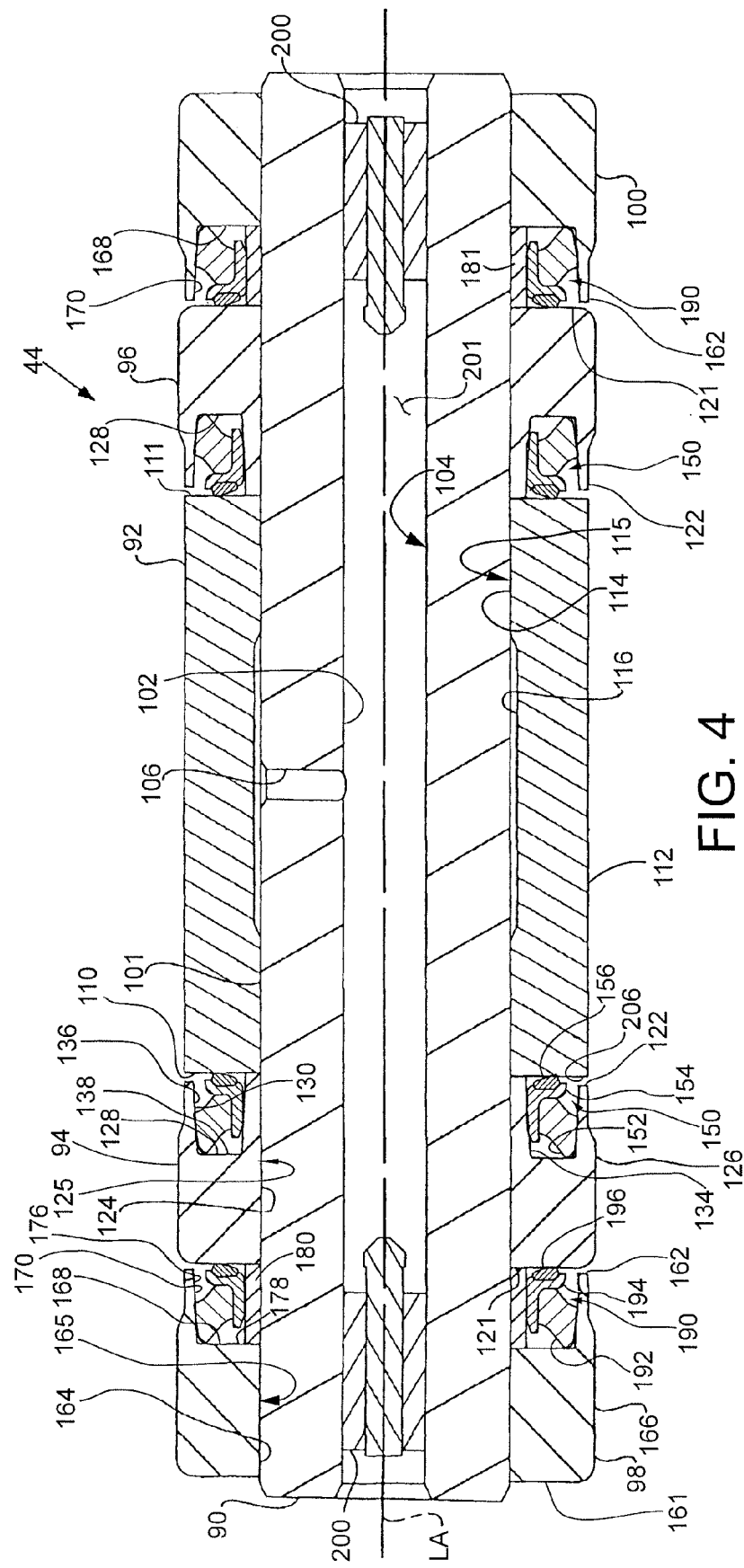
FIG. 4 is a longitudinal cross-sectional view of a pin cartridge assembly of the track chain assembly of FIG. 2.

Referring to FIG. 4, the track pin cartridge assembly 44 is illustrated according to one of several possible embodiments of the present disclosure. The illustrated track pin cartridge assembly 44 includes a track pin 90, a bushing 92, first and second bearing members 94, 96, and first and second collars 98, 100.

The track pin 90 defines a longitudinal axis "LA." The track pin 90 includes an outer surface 101 and an inner surface 102 defining a cylindrical bore 104 extending therethrough along the longitudinal axis "LA" and concentrically disposed about the longitudinal axis "LA." The track pin 90 defines a cross bore 106 that extends from the outer surface 101 thereof inwardly to the bore 104 in a direction perpendicular to the central longitudinal axis "LA."

The bushing 92 has a pair of opposing first and second end faces 110, 111, an outer surface 112, an inner surface 114 defining a passage in the form of a cylindrical bore 115 therethrough that is concentrically disposed about the longitudinal axis "LA," and a stepped passage 116 concentrically positioned with respect to the outer surface 112. The bushing 92 is disposed concentrically about the track pin 90 with the track pin 90 extending through the bore 115 of the bushing 92. The bushing 92 is rotatably positioned about the track pin 90. The first and second end faces 110, 111 of the bushing 92 are disposed adjacent to the first and second bearing members 94, 96, respectively. The outer surface 112 of the bushing 92 is substantially cylindrical. The stepped passage 116 is substantially aligned with the cross bore 106 of the track pin 90.

In other embodiments, the outer surface 112 of the bushing 92 can define a lobed surface, such as is shown and described in U.S. Patent Application Publication No. 2010/0139993 for a "Lobed Bushing For Track Assembly and Track-Type Machine Using Same," which is incorporated in its entirety herein by this reference. In yet other embodiments, the bushing 92 can have a different shape and configuration as known in the art.

It should be appreciated that the first bearing member 94 and the first collar 98 are substantially identical to the second bearing member 96 and the second collar 100, respectively. Therefore, only the first bearing member 94 and the first collar 98 will be described in detail herein. It should be understood that the description of the first bearing member 94 is applicable to the second bearing member 96, and the description of the first collar 98 is applicable to the second collar 100.

The first bearing member 94 includes a first end portion 121, a second end portion 122, an inner surface 124 defining a cylindrical bore 125 therethrough that is concentrically disposed about the longitudinal axis "LA," and an outer surface 126. The bore 125 of the first bearing member 94 can be configured such that the first bearing member 94 can rotate with respect to the track pin 90 about the longitudinal axis "LA."

The first end portion 121 extends radially between the inner surface 124 and the outer surface 126 and forms an abutting surface. The first bearing member 94 is positioned about the track pin 90 so that the second end portion 122 of the first bearing member 94 is adjacent the first end face 110 of the bushing 92. The second end portion 122 defines an axially-extending seal cavity 128 in the form of an annular channel or groove. The first bearing member 94 includes a load ring engagement surface 130 defining, at least in part, the axially-extending seal cavity 128. The seal cavity 128 is positioned in the second end portion 122 such that seal cavity 128 is concentric with central longitudinal axis "LA" of the track pin 90.

The second end portion 122 includes an inner cylindrical axial wall segment 134, an outer cylindrical axial wall segment 136, and a radial base segment 138 extending between the inner and outer cylindrical axial wall segments 134, 136. The inner and outer cylindrical axial wall segments 134, 136 and the radial base segment 138 define the seal cavity 128. The inner and outer cylindrical axial wall segments 134, 136 are concentrically disposed about the longitudinal axis "LA."

The load ring engagement surface 130 can include at least part of the outer cylindrical axial wall segment 136 and/or the radial base segment 138. In the illustrated embodiment, the load ring engagement surface 130 includes at least part of both the outer cylindrical axial wall segment 136 and the radial base segment 138

The outer cylindrical axial wall segment 136 is tapered outwardly with respect to the central longitudinal axis "LA" at a predetermined angle. In one embodiment, the predetermined angle is about 5°. In a similar manner, the inner cylindrical axial wall segment 134 is tapered inwardly with respect to central longitudinal axis "LA." The inner cylindrical axial wall segment 134 extends axially beyond the outer cylindrical axial wall segment 136 toward the first end face 110 of the bushing 92.

The components of the track pin cartridge assembly 44 can define a plurality of annular seal grooves or cavities that are concentrically disposed about the longitudinal axis "LA" of the track pin 90. Each seal cavity is adapted to house therein a seal assembly constructed according to principles of the present disclosure and suitable for sealingly engaging relatively rotatable components of the track pin cartridge assembly 44.

For purposes of illustration, the first bearing member 94 can be considered a first member, and the bushing 92 can be considered a second member. The first member in the form of the first bearing member 94 and the second member in the form of the bushing 92 are both coaxial with the track pin 90 about the longitudinal axis "LA." The first member in the form of the first bearing member 94 is pivotable with respect to the second member in the form of the bushing 92 about a rotational axis that coincides with the longitudinal axis "LA" of the track pin 90. A first seal assembly 150 constructed in accordance with principles of the present disclosure can be disposed within the seal cavity 128 defined in part by the load ring engagement surface 130 adjacent the second end portion 122 of the first member in the form of the first bearing member 94. The axially-extending seal cavity 128 is disposed in proximal relationship to the second member in the form of the bushing 92 in this example. The seal assembly 150 sealingly engages the first member in the form of the first bearing member 94 and the second member in the form of the bushing 92 while allowing relative rotation therebetween.

The first seal assembly 150 includes a load ring 152, a can or seal ring 154, and a seal member in the form of a sealing lip 156. The load ring 152 is made from, for example, an elastomeric material, and the sealing lip 156 is made from a suitable sealing material such as, an elastomeric material including a polyurethane compound, for example. The seal ring 154 can be made from any suitable material, such as metal, for example. The components of the seal assembly 150 can be made from other materials in other embodiments without altering the functional aspects of the design.

The load ring 152 and the sealing lip 156 are positioned in the seal cavity 128 so that the load ring 152 acts upon the seal ring 154 to urge the sealing lip 156 in an axial direction along the longitudinal axis "LA" from the seal cavity 128 into sealing engagement with the first end face 110 of the bushing 92, which can be considered a second member in this instance. The sealing lip 156 can rotate with respect to the sealing surface of the first end face 110 of the bushing 92 against which it is sealingly engaged. The load ring 152 sealingly engages the load ring engagement surface 130 of the first bearing member 94, which can be considered a first member in this instance.

The orientation of the outer cylindrical axial wall segment 136 such that it is angled away from the central longitudinal axis "LA" facilitates the insertion of the first seal assembly 150 into the seal cavity 128. In particular, the predetermined angle of the outer cylindrical axial wall segment 136 enhances the installation capability of the equipment utilized to insert the first seal assembly 150 into the seal cavity 128.

The first collar 98 includes a first end portion 161, a second end portion 162, an inner surface 164 defining a cylindrical bore 165 that is concentrically disposed about the longitudinal axis "LA," and an outer surface 166. The first collar 98 is positioned at one end of the track pin 90 and is press fit with the track pin 90 such that the first collar 98 and the track pin 90 are rotatively coupled together.

The first end portion 161 extends radially between the inner surface 164 and the outer surface 166 and forms an outer radial surface of the track pin cartridge assembly 44. The second end portion 162 defines an axially-extending seal cavity 168 in the form of an annular channel or groove. The first collar 98 includes a load ring engagement surface 170 defining, at least in part, the axially-extending seal cavity 168. The seal cavity 168 is positioned in the second end portion 162 such that seal cavity 168 is concentric with the longitudinal axis "LA."

The second end portion 162 includes an outer cylindrical axial wall segment 176 and a radial base segment 178 extending between the outer cylindrical axial wall segment 176 and the inner surface 164. A first thrust ring 180 is disposed between the first collar 98 and the first bearing member 94 and is adapted to transmit axial loads therebetween. The outer cylindrical axial wall segment 176, the radial base segment 178, and the first thrust ring 180 define the seal cavity 168. A second thrust ring 181 is similarly disposed between the second collar 100 and the second bearing member 96 and is adapted to transmit axial loads therebetween.

The seal cavity 168 of the first collar 98 is substantially similar in configuration to the seal cavity 128 of the first bearing member 94. For example, the outer cylindrical axial wall segment 176 can be tapered outwardly with respect to the central longitudinal axis "LA" at a predetermined angle similar to the outer cylindrical axial wall segment 136 of the first bearing member 94. In one embodiment, the predetermined angle is about 5°.

The load ring engagement surface 170 can include at least part of the outer cylindrical axial wall segment 176 and/or the radial base segment 178. In the illustrated embodiment, the load ring engagement surface 170 includes at least part of both the outer cylindrical axial wall segment 176 and the radial base segment 178.

A second seal assembly 190 is disposed in the seal cavity 168 defined in part by the load ring engagement surface 130 adjacent the second end portion 162 of the first collar 98. The seal assembly 190 sealingly engages a first member in the form of the first collar 98 and a second member in the form of the first bearing member 94 while allowing relative rotation therebetween.

The second seal assembly 190 includes a load ring 192, a seal ring 194, and a seal member in the form of a sealing lip 196. The components of the second seal assembly 190 are similar in composition and function to that of the first seal assembly 150 as described above in connection with the seal cavity 128 of the first bearing member 94.

The load ring 192 and the sealing lip 196 of the second seal assembly 190 are positioned in seal cavity 168 so that the load ring 192 acts upon the seal ring 194 to urge the sealing lip 196 in an axial direction along the longitudinal axis "LA" from the seal cavity 168 into sealing engagement with the first end portion 121 of the first bearing member 94, which can be considered a second member in this instance. The sealing lip 196 can rotate with respect to the sealing surface of the first end portion 121 of the first bearing member 94 against which it is sealingly engaged. The load ring 192 sealingly engages the load ring engagement surface 170 of the first collar 98, which can be considered a first member in this instance.

The track pin cartridge assembly 44 is arranged with the bushing 92 disposed between the first and second bearing members 94, 96, which, in turn, are respectively disposed between the first collar 98 and the bushing 92 and the second collar 100 and the bushing 92. The first bearing member 94 is positioned about the track pin 90 so that the second end portion 122 of the first bearing member 94, which defines the seal cavity 128, is adjacent the first end face 110 of the bushing 92. The second bearing member 96 is positioned about the track pin 90 so that the second end portion 122 of the second bearing member 96, which defines the seal cavity 128, is adjacent the second end face 111 of the bushing 92. The first and second collars 98, 100 are positioned about the track pin 90 so that the second end portion 162 of each of the first and second collars 98, 100, which defines the seal cavity 168, is respectively adjacent the first end portion 121 of the first and second bearing members 94, 96.

The first and second collars 98, 100 can be positioned with respect to the ends of the track pin 90 such that the seal assemblies 150, 190 of the track pin cartridge assembly 44 are compressively engaged between the respective adjacent components to sealingly contact the sealing surfaces of the adjacent members such that a running fluid-tight seal is formed therebetween. As shown, each load ring 152, 192 sealingly engages the first member and is placed in compression thereby. The compression of the load rings 152, 192 provides a sealing force to each corresponding sealing lip 156, 196, which is sealingly engaged against the sealing surface of the second member to form a running fluid-tight seal therebetween.

The use of the terms "first member" and "second member" are for illustrations purposes and are merely convenient labels applied to illustrative pairs of relatively rotatable components to describe various principles of the present disclosure. These phrases should not be viewed as limiting in any way. It should be understood by one skilled in the art that other pairs of first and second members (such as, the relative movement between the second bearing member 96 and the bushing 92 and/or the second collar 100 and the second bearing member 96) are present in the track pin cartridge assembly 44 and similarly equipped with a seal assembly 150, 190 constructed in accordance with principles of the present disclosure. Each seal assembly 150, 190 can be adapted to sealingly engage both the first and the second members between which it is respectively disposed.

The illustrated track pin cartridge assembly 44 includes four seal assemblies 150, 190. A pair of seal assembles 150 is respectively disposed between the first end face 110 of the bushing 92 and the second end portion 122 of the first bearing member 94 and between the second end face 111 of the bushing 92 and the second end portion 122 of the second bearing member 96. Another pair of seal assemblies 190 is respectively disposed between the first end portion 121 of the first and second bearing members 94, 96 and the second end portion 162 of the first and second collars 98, 100.

A pair of plugs 200 are positioned in the bore 104 of the track pin 90 forming a fluid reservoir 201 in the bore 104 thereof. The pair of plugs 200 sealably prevents a fluid, such as lubricating oil, from leaking from the bore 104. In use, fluid disposed within the fluid reservoir 201 of the track pin cartridge assembly 44, is in fluid communication with and advanced through the cross bore 106 to the outer surface 101 of track pin 90. Once disposed on the outer surface 101, the fluid facilitates the rotation of the first and second bearing members 94, 96 and the bushing 92 relative to the track pin 90. Retention of the fluid within the track pin cartridge assembly 44 is assisted by the first and second seal assemblies 150, 190 respectively disposed in the seal cavities 128, 168 of the first and second bearing members 94, 96 and the first and second collars 98, 100 while keeping debris out (e.g. sand, dirt, etc).

Referring to FIG. 2, each set of inner and outer links 46, 48 can be rotatively mounted to the track pin cartridge assembly 44. In particular, the inner and outer links 46, 48 can be respectively coupled with the first and second bearing members 94, 96 of the track pin cartridge assembly 44 to form a pair of first link assemblies 202. The inner and outer master links 52, 54 can be respectively coupled with the first and second collars 98, 100 to form a pair of second link assemblies 203.

Each first link assembly 202 and second link assembly 203 is mounted to the track pin 90 such that the first and second link assemblies 202, 203 are rotatable with respect to each other about the longitudinal axis "LA" of the track pin 90. In this way, the inner and outer links 46, 48 can rotate relative to the inner and outer master links 52, 54.

In this example, the second link assemblies 203 each include a first member in the form of the first and second collars 98, 100. The load ring engagement surfaces 170 of the first and second collars 98, 100 define, at least in part, the seal cavities 168 respectively disposed between cooperating first link assembly 202 and second link assembly 203 adjacent each end face 110, 111 of the bushing 92. A seal assembly 190 is disposed in each seal cavity 168 to sealingly engage the first link assembly 202 and the second link assembly 203 (see FIG. 4 also).

Although the track pin cartridge assembly 44 shown in FIG. 4 has a seal cavity 128 positioned in the first and second bearing members 94, 96 and a seal cavity 168 positioned in the first and second collars 98, 100, it is also contemplated that the seal cavities 128, 168 are located in other positions in other embodiments. Accordingly, in other embodiments of a track pin joint assembly, other components (such as, the bushing 92 and the track links 46, 48, 52, 54, for example) can define suitable seal cavities, and other seal cavity locations within the components of the track pin joint assembly can be used.

For example, in one embodiment, a seal cavity may be positioned in the first and second end faces 110, 111 of the bushing 92 with each of the first and second bearing members 94, 96 flipped end for end. In such an embodiment, the seal groove or the seal cavity 168 in the first and second collars 98, 100 can be omitted. In another embodiment, a seal cavity may be positioned in the first and second end faces 110, 111 of the bushing 92 and in the second end portions 162 of the first and second collars 98, 100. In such an embodiment, the seal cavities 128 of the first and second bearing members 94, 96 can be omitted. In yet another embodiment, the first and second bearing members 94, 96 can include first and second end portions 121, 122 that both include a seal cavity. In such an embodiment, the seal groove or the seal cavity 168 in the first and second collars 98, 100 can be omitted.

In other embodiments, a pin cartridge assembly according to principles of the present disclosure can include other components and have different arrangements. For example, in other embodiments the pin cartridge assembly can include sleeve bearings and other components as shown and described in U.S. Patent Application Publication No. 2006/0284485, which is incorporated in its entirety herein by this reference.

Figure 5:
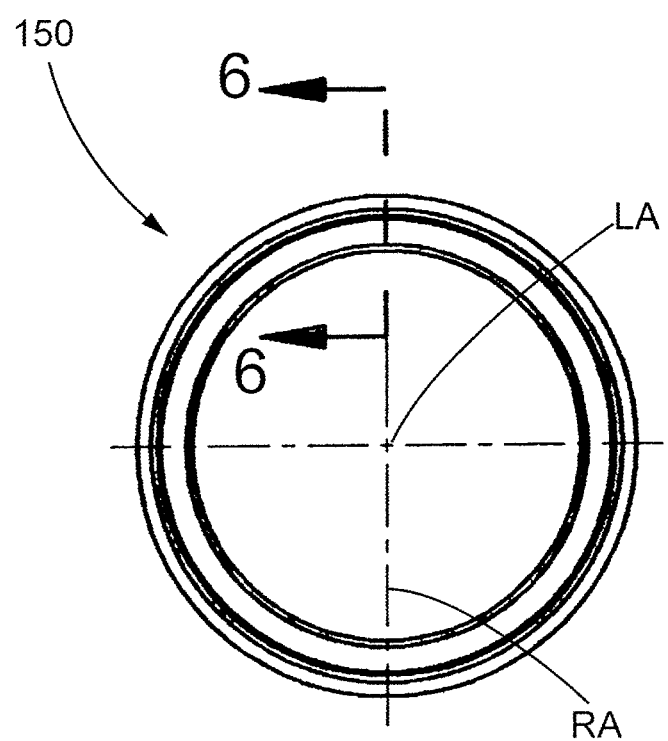
FIG. 5 is an end elevational view of an embodiment of a seal assembly constructed in accordance with principles of the present disclosure.

In yet other embodiments of a track chain assembly, the track chain assembly can include a plurality of subassemblies each including a cartridge assembly, an inner offset link, an outer offset link, and a track shoe connected to the inner and outer offset links. An inner offset master link and an outer offset master link can be is used to connect opposite ends of the track chain assembly to form a closed loop. The inner and outer offset links and the inner and outer offset master links, can be offset links each being a mirror image of the other and can be substantially similar to the inner and outer links 16', 18' and the inner and outer master links 22', 24' described in U.S. Pat. No. 6,739,680, which is incorporated in its entirety herein by this reference, and as shown in FIGS. 4 and 5 thereof. In yet other embodiments, the track chain assembly can have other track configurations, such as those having S-shaped links or multi-piece links.

Figure 6:
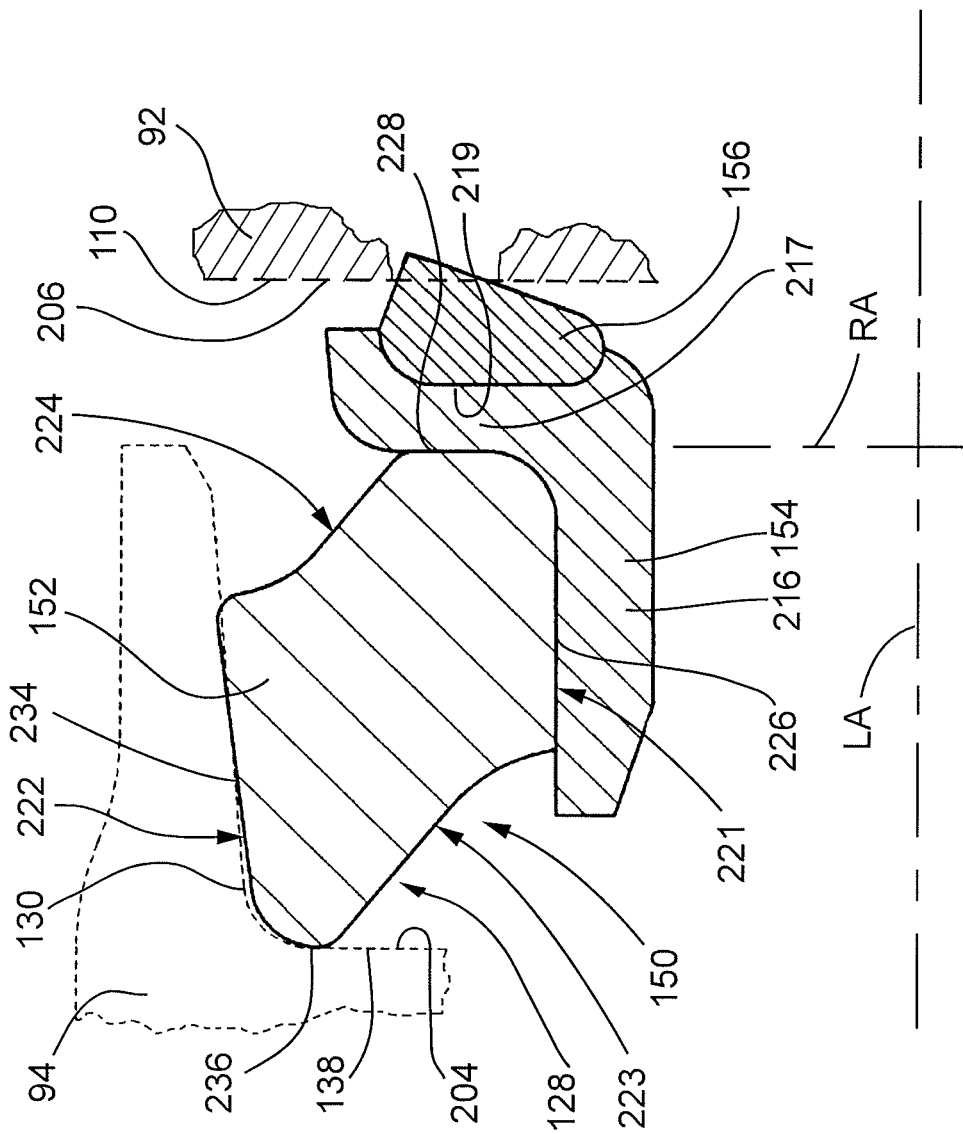
FIG. 6 is a cross-sectional view taken along line 6-6 in FIG. 5 of the seal assembly of FIG. 5, the seal assembly shown in an uninstalled state in comparison to surfaces of a seal cavity of a first member and a sealing surface of a second member shown in phantom lines.

Referring to FIGS. 5 and 6, the first seal assembly 150, which is constructed in accordance with principles of the present disclosure, is shown in an uninstalled state wherein the components are not compressed. Referring to FIG. 5, the components of the first seal assembly 150 are in the shape of an annular ring. Referring to FIG. 6, the cross-sectional shapes of the components of the first seal assembly 150 are shown. It should be understood that the illustrated components have a substantially similar configuration about their entire circumference such that a cross-sectional view taken through another plane intersecting the center of the seal assembly would be substantially similar.

The first seal assembly 150 includes the load ring 152, the can or seal ring 154, and the sealing lip 156 extending axially from the seal ring 154. Inasmuch as the second seal assembly 190 is identical to the first assembly 150, it will be understood that the description of the first assembly 150 is also applicable to the second seal assembly 190.

The first seal assembly 150 is adapted for use in sealing a joint having a first member pivotable about a rotational axis relative to a second member, such as the first bearing member 94 being pivotable about the longitudinal axis "LA" of the track pin 90 relative to the bushing 92, for example. The first member in the form of the first bearing member 94 includes the load ring engagement surface 130 and a base surface 204 of the radial base segment 138 defining, at least in part, the axially-extending seal cavity 128 about the rotational axis "LA."

The load ring engagement surface 130 of FIG. 6 has a generally straight profile. In other embodiments, the load ring engagement surface 130 can have a different shape. The load ring engagement surface 130 of the first member sealingly engages the load ring 152.

An inner surface of the first member, such as the inner cylindrical axial wall segment 134 (shown in FIG. 4), also defines the seal cavity 128. In some embodiments, the inner surface can be integrally formed with the load ring engagement surface 130 and the base surface 204 or can be provided by an insert sleeve component, such as by the thrust ring 180, for example. In other embodiments, the base surface 204 can be defined by a separate thrust ring (not shown).

The second member includes a sealing surface 206 in sealing engagement with the sealing lip 156 of the seal assembly 150. The sealing surface 206 is part of the first end face 110 of the bushing 92 in the example illustrated in FIG. 6.

Referring to FIG. 6, the sealing lip 156 is in the form of an annulus and extends axially from the seal ring 154 along the longitudinal axis "LA." The sealing lip 156 is adapted to sealingly engage, in a running fluid-tight seal, one of the members of the track pin joint assembly which is rotationally movable with respect to another member thereof. In the illustrated example, the sealing lip 156 is adapted to sealingly engage the sealing surface 206 of the first end face 110 of the bushing 92, which can be considered the second member of the track pin joint assembly, where the bushing 92 is rotationally movable with respect to the first member in the form of the first bearing member 94 about the longitudinal axis "LA" of the track pin 90. In other embodiments, the sealing lip 156 can have a different cross-sectional shape.

The seal ring 154 is in the form of an annulus. The seal ring 154 has an axial flange 216, extending along the longitudinal axis "LA", and a radial flange 217, extending along a radial axis "RA" perpendicular to the rotational axis "LA".

In some embodiments, the sealing lip 156 is separately formed and then attached to the seal ring 154. In the illustrated embodiment, the radial flange 217 defines a concave groove 219 adapted to receive the sealing lip 156 therein. In other embodiments, the seal ring 154 and the sealing lip 156 can be integrally formed as a unitary structure. The seal ring 154 can be made from a rigid material and transmit force from the load ring 152 when installed and under compression. The force from the load ring 152 is transferred from the seal ring 154 to the sealing lip 156 as a sealing force against the second member.

Figure 7:
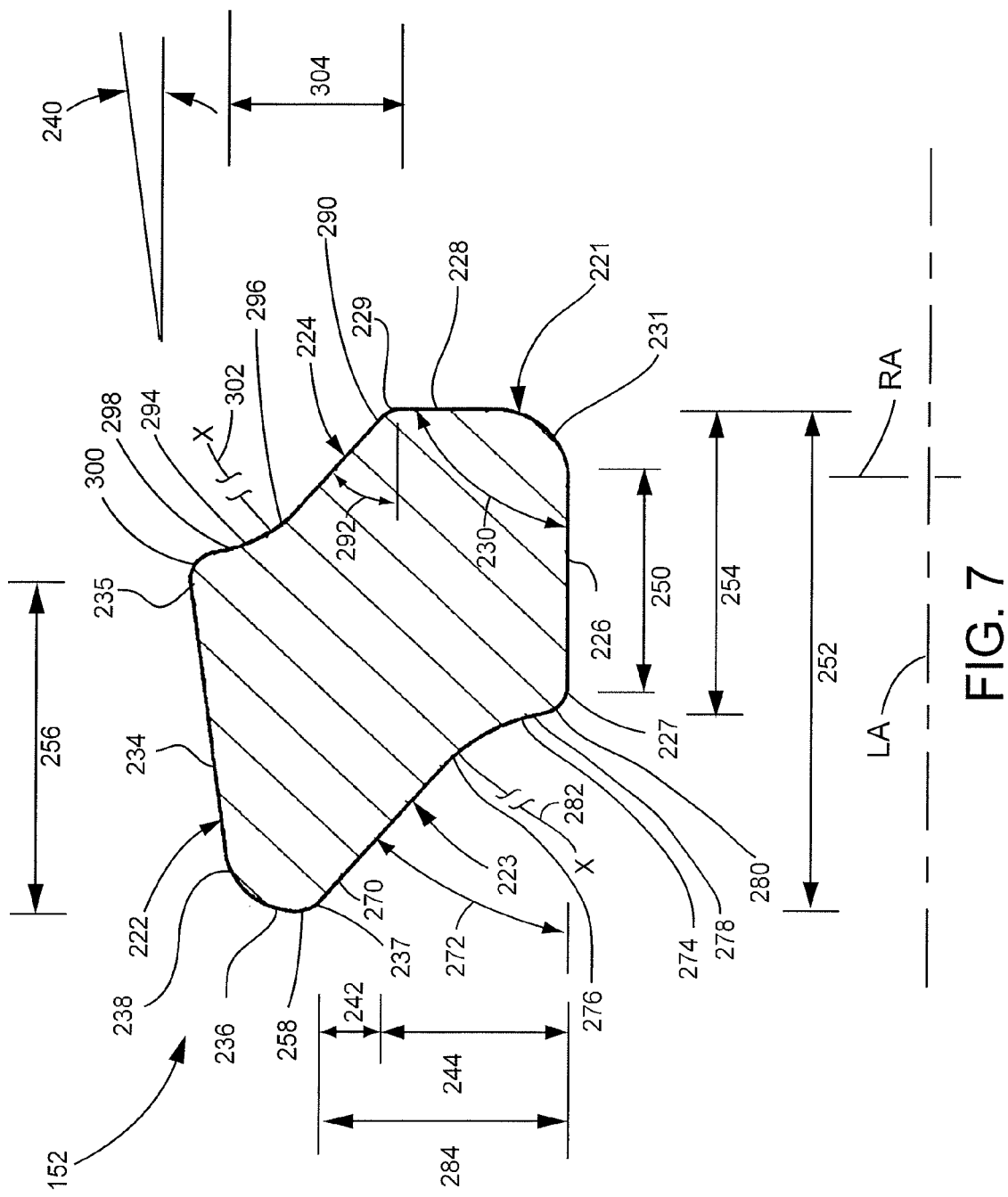
FIG. 7 is a cross-sectional view, as in FIG. 6, of a load ring of the seal assembly of FIG. 5.

Referring to FIGS. 6 and 7, the load ring 152 includes a seal ring engagement surface 221, a first member engagement surface 222, an inner relief surface 223, and an outer relief surface 224. The seal ring engagement surface 221 is adapted to engage the seal ring 154. The seal ring engagement surface 221 includes an axial segment 226 in proximate relationship with the axial flange 216 of the seal ring 154 and a radial segment 228 in proximate relationship with the radial flange 217 of the seal ring 154. The seal ring engagement surface 221 extends between an axial edge 227 and an outer radial edge 229. In some embodiments and as shown, the axial segment 226 may extend in substantially parallel relationship to the longitudinal axis "LA" of the track pin 90 when installed about the track pin 90 in a joint assembly.

Referring to FIG. 6, the radial segment 228 extends at an angle 230 with respect to the axial segment 226. The angle 230 may be in a range from twenty degrees to one hundred sixty degrees. As shown, the radial segment 228 and the axial segment 226 of the seal ring engagement surface 221 are disposed in substantially perpendicular relationship with respect to each other. The radial segment 228 is substantially perpendicular to the longitudinal axis "LA" of the track pin 90 when installed about the track pin 90 in a joint assembly (see FIG. 6). A convex segment 231 can be disposed between the axial segment 226 and the radial segment 228

The first member engagement surface 222 is adapted to sealingly engage the load ring engagement surface 130 of the first member (see FIG. 6). The first member engagement surface 222 is disposed in opposing relationship to the seal ring engagement surface 221 and includes an axial segment 234 and a radial segment 236. The first member engagement surface 222 extends between an outer radial edge 235 and an inner radial edge 237. An intermediate edge 238 is disposed between the axial segment 234 and the radial segment 236.

The axial segment 234 of the first member engagement surface 222 can have a substantially frusto-conical shape, being disposed in oblique relationship to the axial segment 226 of the seal ring engagement surface 221 and to the longitudinal axis "LA" of the track pin 90 when installed about the track pin 90 in a joint assembly. In some embodiments, the axial segment 234 of the first member engagement surface 222 can extend at an angle 240 with respect to the axial segment 226 of the seal ring engagement surface 221 that is in a range from zero degrees to about fifteen degrees, moving in a counterclockwise direction from the axial segment 226 of the seal ring engagement surface 221 to the axial segment 234 of the first member engagement surface 222 as shown in FIG. 7. The illustrated angle 240 between the axial segment 234 of the first member engagement surface 222 and the axial segment 226 of the seal ring engagement surface 221 is about seven degrees.

The radial segment 236 of the first member engagement surface 222 is shaped to engage a portion of the base surface 204 in the seal cavity 128 (see FIG. 5). The radial segment 236 of the first member engagement surface 222 is in distal relationship with the radial segment 228 of the seal ring engagement surface 221. The radial segment 236 of the first member engagement surface 222 has a rounded convex shape. In other embodiments, the radial segment 236 of the first member engagement surface 222 can include a straight portion.

The radial segment 236 of the first member engagement surface 222 is radially offset, measured along the radial axis "RA," from the radial segment 228 of the seal ring engagement surface 221. The radial segment 236 of the first member engagement surface 222 extends radially between the inner radial edge 237 and the intermediate edge 238 of the first member engagement surface 222 with the inner radial edge 237 being the innermost radial point of the radial segment. The outermost radial point of the radial segment 228 of the seal ring engagement surface 221 is the outer radial edge 229 of the seal ring engagement surface 221. The inner radial edge 237 of the radial segment 236 of the first member engagement surface 222 is disposed radially outwardly a predetermined radial distance 242 from the outer radial edge 229 of the radial segment 228 of the seal ring engagement surface 221 such that the radial segment 236 of the first member engagement surface 222 is in non-overlapping radial relationship with the radial segment 228 of the seal ring engagement surface 221.

In some embodiments, the radial distance 242 separating the outer radial edge 229 of the radial segment 228 of the seal ring engagement surface 221 and the inner radial edge 237 of the radial segment 236 of the first member engagement surface 222 is at least fifty percent of the radial distance 244 between the axial edge 227 and the outer radial edge 229 of the seal ring engagement surface 221. The illustrated radial distance 242 separating the outer radial edge 229 of the radial segment 228 of the seal ring engagement surface 221 and the inner radial edge 237 of the radial segment 236 of the first member engagement surface 222 is about sixty percent of the radial distance 244 between the axial edge 227 and the outer radial edge 229 of the seal ring engagement surface 221.

The axial segment 226 of the seal ring engagement surface 221 of the load ring 152 has an axial length 250 that extends a distance measured along the rotational axis "LA" that is at least about forty percent of the axial length 252 between the radial segment 228 of the seal ring engagement surface 221 and the radial segment 236 of the first member engagement surface 222. In yet other embodiments, the axial length 250 of the axial segment 226 of the seal ring engagement surface 221 of the load ring 152 is at least about half the axial length 252 between the radial segment 228 of the seal ring engagement surface 221 and the convex crown 258 of the radial segment 236 of the first member engagement surface 222. The axial length 250 of the illustrated axial segment 226 of the seal ring engagement surface 221 is about fifty percent of the length 252 between the radial segment 228 of the seal ring engagement surface 221 and the radial segment 236 of the first member engagement surface 222.

The axial length 254, measured along the rotational axis "LA," of the seal ring engagement surface 221 is equal to at least sixty percent of the axial length 256 of the first member engagement surface 222. The axial length 254 of the illustrated seal ring engagement surface 221 can be measured between the outer radial edge 229 and the axial edge 227. The axial length 256 of the first member engagement surface 222 can be measured between the outer radial edge 235 and a convex crown 258 of the radial segment 236.

In other embodiments, the axial length 254 of the seal ring engagement surface 221 is equal to at least eighty percent, of the axial length 256 of the first member engagement surface 222. In yet other embodiments, the axial length 254 of the seal ring engagement surface 221 is in a range from about sixty percent of the axial length 256 of the first member engagement surface 222 to about one hundred twenty-five percent the axial length 256 of the first member engagement surface 222. The axial length 254 of the illustrated seal ring engagement surface 221 is about eighty-five percent of the axial length 256 of the first member engagement surface 222.

The inner relief surface 223 extends between the radial segment 236 of the first member engagement surface 222 and the axial segment 226 of the seal ring engagement surface 221. The inner relief surface 223 extends between the inner radial edge 237 of the radial segment 236 of the first member engagement surface 222 and the axial edge 227 of the axial segment 226 of the seal ring engagement surface 221.

The illustrated inner relief surface 223 includes an inclined segment 270 which is disposed at an oblique angle 272 with respect to the axial segment 226 of the seal ring engagement surface 221 and the rotational axis "LA." The inclined segment 270 of the inner relief surface 223 is adjacent the radial segment 236 of the first member engagement surface 222. In embodiments, the oblique angle 272 of the inclined segment 270 of the inner relief surface 223 with respect to the axial segment 226 of the seal ring engagement surface 221 can be in a range from about twenty degrees to about sixty degrees. The illustrated angle 272 between the inclined segment 270 of the inner relief surface 223 and the axial segment 226 of the seal ring engagement surface 221 is about forty degrees.

The inner relief surface 223 includes a reverse curve portion 274 adjacent the axial segment 226 of the seal ring engagement surface 221. The reverse curve portion 274 of the inner relief surface 223 includes a concave segment 276, a transition segment 278, and a convex segment 280.

The concave segment 276 is disposed adjacent the inclined segment 270 of the inner relief surface 223. The concave segment 276 is defined by a radius 282 that is preferably in a range from about half to about one and a half times the radial length 284 of the inner relief surface 223, measured along the radial axis "RA" between the axial edge 227 of the axial segment 226 of the seal ring engagement surface 221 and the inner radial edge 237 of the radial segment 236 of the first member engagement surface 222. In yet other embodiments, the radius 282 of the concave segment 276 is in a range from about half to about equal to the radial length 284 of the inner relief surface 223. The illustrated radius 282 of the concave segment 276 is about two-thirds of the radial length 284 of the inner relief surface 223.

The convex segment 280 is disposed adjacent the axial segment 226 of the seal ring engagement surface 221. The illustrated convex segment 280 abuts the axial edge 227 of the axial segment 226 of the seal ring engagement surface 221. The transition segment 278 is disposed between the concave segment 276 and the convex segment 280.

The outer relief surface 224 extends between the axial segment 234 of the first member engagement surface 222 and the radial segment 228 of the seal ring engagement surface 221. The outer relief surface 224 extends between the outer radial edge 235 of the axial segment 234 of the first member engagement surface 222 and the outer radial edge 229 of the axial segment 226 of the seal ring engagement surface 221.

The illustrated outer relief surface 224 includes an inclined segment 290 which is disposed at an oblique angle 292 with respect to the axial segment 226 of the seal ring engagement surface 221 and the rotational axis "LA." The inclined segment 290 of the outer relief surface 224 is adjacent the radial segment 228 of the seal ring engagement surface 221. The angle 292 of the inclined segment 290 of the outer relief surface 224 with respect to the axial segment 226 of the seal ring engagement surface 221 is in a range from about twenty degrees to about sixty degrees. The illustrated angle 292 between the inclined segment 290 of the outer relief surface 224 and the axial segment 226 of the seal ring engagement surface 221 is about forty degrees.

The outer relief surface 224 includes a reverse curve portion 294 adjacent the axial segment 234 of the first member engagement surface 222. The reverse curve portion 294 of the outer relief surface 224 includes a concave segment 296, a transition segment 298, and a convex segment 300.

The concave segment 296 of the outer relief surface 224 is disposed adjacent the inclined segment 290 of the outer relief surface 224. The concave segment 296 is defined by a radius 302 that is preferably in a range from about half to about one and a half times the radial length 304 of the outer relief surface 224, measured along the radial axis "RA" between the outer radial edge 229 of the radial segment 228 of the seal ring engagement surface 221 and the outer radial edge 235 of the axial segment 234 of the first member engagement surface 222. In yet other embodiments, the radius 302 of the concave segment 296 of the outer relief surface 224 is in a range from about half to about equal to the radial length 304 of the outer relief surface 224. The illustrated radius 302 of the concave segment 296 of the outer relief surface 224 is about two-thirds of the radial length 304 of the outer relief surface 224.

The convex segment 300 of the outer relief surface 224 is disposed adjacent the axial segment 234 of the first member engagement surface 222. The illustrated convex segment 300 abuts the outer radial edge 235 of the axial segment 234 of the first member engagement surface 222. The transition segment 298 of the outer relief surface 224 is disposed between the concave segment 296 and the convex segment 300 of the outer relief surface 224.

The radial length 284 of the inner relief surface 223 is greater than the radial length 304 of the outer relief surface 224. In some embodiments, the radial length 284 of the inner relief surface 223 can be in a range from greater than to about one and a half times greater than the radial length 304 of the outer relief surface 224. The illustrated radial length 284 of the inner relief surface 223 is about one and a quarter times the radial length 304 of the outer relief surface 224.

The inclined segments 270, 290 of the inner relief surface 223 and the outer relief surface 224 are each at an oblique angle 272, 292, with respect to the axial segment 226 of the seal ring engagement surface 221, in a range from about twenty degrees to about sixty degrees. The illustrated inclined segments 270, 290 of the inner relief surface 223 and the outer relief surface 224 are substantially parallel to each other.

The radius 282 of the concave segment 276 of the inner relief surface 223 is greater than the radius 302 of the concave segment 296 of the outer relief surface 224. In some embodiments, the radius 282 of the concave segment 276 of the inner relief surface 223 can be in a range from greater than to about one and two times greater than the radius 302 of the concave segment 296 of the outer relief surface 224. The illustrated radius 282 of the concave segment 276 of the inner relief surface 223 is about one and one-third times the radius 302 of the concave segment 296 of the outer relief surface 224.

Referring to FIG. 4, when the first seal assembly 150 is installed in the seal cavity 128, the sealing lip 156 is in sealing engagement with the sealing surface 206 of the second member in the form of the first end face 110 of the bushing 92. The axial segment 234 of the first member engagement surface 222 of the load ring 152 engages and conforms to the load ring engagement surface 130 of the first member in the form of the first bearing member 94. The load ring 152 acts as a gasket and sealingly engages the first member in the form of the first bearing member 94 and the seal ring 154. The first member engagement surface 222 of the load ring 152 engages the load ring engagement surface 130 of the first member in the form of the first bearing member 94. Compression of the load ring 152 provides the sealing force to the sealing lip 156 against the sealing surface 206 of the second member in the form of the bushing 92. The load ring 152 acts in the manner of a spring to apply an axial load against the seal ring 154 along the longitudinal axis "LA" to bring the sealing lip 156 mounted to the seal ring 154 into sealing contact with the sealing surface 206 of the second member in the form of the bushing 92 such that a running fluid-tight seal is formed therebetween.

INDUSTRIAL APPLICABILITY

The industrial applicability of the embodiments of a seal assembly and joint assembly described herein will be readily appreciated from the foregoing discussion. At least one embodiment of the disclosed seal assemblies may be used for a track pin joint assembly. At least one embodiment of the disclosed seal assemblies may be used for a track pin joint assembly in the form of a track pin cartridge assembly. At least one embodiment of the disclosed track pin joint assemblies can be used in an undercarriage of a track-type machine. At least one embodiment provides a seal assembly that may keep dirt out and keep lubrication within a track joint.

In general, a seal assembly has been disclosed that can help resist the ingestion of mud and debris and thus help inhibit the occurrence of heel under failures of a seal. During use, the load ring of a seal assembly according to principles of the present disclosure may provide one or more of the following benefits. The load ring may maintain sealing force capability between the load ring engagement surface of one member of a track pin joint and the sealing surface of another member of the track pin joint while permitting relative rotational movement therebetween.

Embodiments of a seal assembly, a track pin joint assembly, and an undercarriage according to principles of the present disclosure may find potential application in any machine, such as a track-type tractor, which utilizes a track-type undercarriage. Such machines may include, but are not limited to, dozers, loaders, excavators, or any other on-highway or off-highway vehicles or stationary machines that utilize a track chain assembly, as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A seal assembly adapted for use in sealing a joint having a first member pivotable about a rotational axis relative to a second member thereof, the first member including a load ring engagement surface defining, at least in part, an axially-extending seal cavity about the rotational axis, the seal assembly comprising:
   a seal ring, the seal ring having an axial flange, extending along the rotational axis, and a radial flange, extending along a radial axis perpendicular to the rotational axis; and
   a load ring, the load ring including a seal ring engagement surface, a first member engagement surface, an inner relief surface, and an outer relief surface, the seal ring engagement surface including a radial segment in proximate relationship with the radial flange of the seal ring and an axial segment in proximate relationship with the axial flange of the seal ring, the first member engagement surface including a radial segment and an axial segment, the radial segment of the first member engagement surface being in distal relationship with the radial segment of the seal ring engagement surface, the inner relief surface extending between the radial segment of the first member engagement surface and the axial segment of the seal ring engagement surface, and the outer relief surface extending between the axial segment of the first member engagement surface and the radial segment of the seal ring engagement surface;
   wherein the inner relief surface includes an inclined segment which is disposed at an oblique angle with respect to the rotational axis, and the outer relief surface includes an inclined segment which is disposed at an oblique angle with respect to the rotational axis;
   wherein the radial segment of the first member engagement surface is radially offset, measured along the radial axis, from the radial segment of the seal ring engagement surface.

2. The seal assembly of claim 1, wherein the axial segment of the first member engagement surface has a substantially frusto-conical shape and is disposed in oblique relationship to the axial segment of the seal ring engagement surface.

3. The seal assembly of claim 1, wherein the inclined segment of the inner relief surface and the inclined segment of the outer relief surface are substantially parallel to each other.

4. The seal assembly of claim 1, wherein the inclined segment of the inner relief surface and the inclined segment of the outer relief surface are each at an angle, with respect to the axial segment of the seal ring engagement surface, in a range from about twenty degrees to about sixty degrees.

5. The seal assembly of claim 1, wherein the inner relief surface includes a reverse curve portion adjacent the axial segment of the seal ring engagement surface, and the inclined segment of the inner relief surface is adjacent the radial segment of the first member engagement surface.

6. The seal assembly of claim 5, wherein the reverse curve portion of the inner relief surface includes a concave segment, a transition segment, and a convex segment, the concave segment disposed adjacent the inclined segment of the inner relief surface, the convex segment disposed adjacent the axial segment of the seal ring engagement surface, and the transition segment disposed between the concave segment and the convex segment.

7. The seal assembly of claim 6, wherein the outer relief surface includes a reverse curve portion adjacent the axial segment of the first member engagement surface, and the inclined segment of the outer relief surface is adjacent the radial segment of the seal ring engagement surface, the reverse curve portion of the outer relief surface includes a concave segment, a transition segment, and a convex segment, the concave segment of the outer relief surface disposed adjacent the inclined segment of the outer relief surface, the convex segment of the outer relief surface disposed adjacent the axial segment of the first member engagement surface, and the transition segment of the outer relief surface disposed between the concave segment and the convex segment of the outer relief surface.

8. The seal assembly of claim 5, wherein the outer relief surface includes a reverse curve portion adjacent the axial segment of the first member engagement surface, and the inclined segment of the outer relief surface is adjacent the radial segment of the seal ring engagement surface.

9. The seal assembly of claim 1, wherein the outer relief surface includes a reverse curve portion adjacent the axial segment of the first member engagement surface, and the inclined segment of the outer relief surface is adjacent the radial segment of the seal ring engagement surface.

10. The seal assembly of claim 9, wherein the reverse curve portion of the outer relief surface includes a concave segment, a transition segment, and a convex segment, the concave segment disposed adjacent the inclined segment of the outer relief surface, the convex segment disposed adjacent the axial segment of the first member engagement surface, and the transition segment disposed between the concave segment and the convex segment.

11. The seal assembly of claim 1, wherein the axial segment of the seal ring engagement surface of the load ring extends over at least forty percent of a distance, measured along the rotational axis, between the radial segment of the seal ring engagement surface and the radial segment of the first member engagement surface.

12. The seal assembly of claim 11, wherein the seal ring engagement surface has an axial length, measured along the rotational axis, equal to at least sixty percent of an axial length of the first member engagement surface.

13. The seal assembly of claim 1, wherein the radial segment of the first member engagement surface of the load ring is convex.

14. The seal assembly of claim 1, further comprising:
   a sealing lip, the sealing lip extending along the rotational axis from the radial flange of the seal ring and adapted to sealingly engage the second member.

15. The seal assembly of claim 1, wherein the radial segment and the axial segment of the seal ring engagement surface of the load ring are disposed at an angle, with respect to each other, in a range from about twenty degrees to about one hundred sixty degrees.

16. The seal assembly of claim 15, wherein the radial segment and the axial segment of the seal ring engagement surface of the load ring are disposed in substantially perpendicular relationship with respect to each other.

17. A track pin cartridge assembly comprising:
a track pin defining a longitudinal axis;
a first member and a second member both coaxial with the track pin about the longitudinal axis, the first member being pivotable about the longitudinal axis with respect to the second member, the first member including a load ring engagement surface defining, at least in part, a seal cavity disposed in proximal relationship to the second member; and
a seal assembly, the seal assembly disposed in the seal cavity and sealingly engaging the first member and the second member, the seal assembly comprising:
a seal ring, the seal ring having an axial flange, extending along the longitudinal axis, and a radial flange, extending along a radial axis perpendicular to the longitudinal axis; and
a load ring, the load ring including a seal ring engagement surface, a first member engagement surface, an inner relief surface, and an outer relief surface, the seal ring engagement surface including a radial segment in proximate relationship with the radial flange of the seal ring and an axial segment in proximate relationship with the axial flange of the seal ring, the first member engagement surface engaging the load ring engagement surface of the first member, the first member engagement surface including a radial segment and an axial segment, the radial segment of the first member engagement surface being in distal relationship with the radial segment of the seal ring engagement surface, the inner relief surface extending between the radial segment of the first member engagement surface and the axial segment of the seal ring engagement surface and having an inclined segment, and the outer relief surface extending between the axial segment of the first member engagement surface and the radial segment of the seal ring engagement surface and having an inclined segment;
wherein, when the load ring is in an uncompressed condition, the inclined segment of the inner relief surface is disposed at an oblique angle with resect to the longitudinal axis, the inclined segment of the outer relief surface is disposed at an oblique angle with respect to the longitudinal axis, and the radial segment of the first member engagement surface is radially offset, measured along the radial axis, from the radial segment of the seal ring engagement surface.

18. The track pin cartridge assembly of claim 17, wherein the second member comprises a bushing having a first end face and a second end face and a passage defined therethrough, the bushing being rotatably positioned about the track pin, and the first member comprises a first bearing member having a first end portion, a second end portion and a bore defined therethrough, the first bearing member positioned about the track pin so that the second end portion of the first bearing member is adjacent the first end face of the bushing, the second end portion of the first bearing member defining the seal cavity.

19. The track pin cartridge assembly of claim 18, further comprising:
a second bearing member having a first end portion, a second end portion and a bore defined therethrough, the second bearing member positioned about the track pin so that the second end portion of the second bearing member is adjacent the second end face of the bushing;
first and second collars each having a first end portion, a second end portion and a bore defined therethrough, the first and second collars being positioned about the track pin so that the second end portion of each of the collars is respectively adjacent the first end portion of the first bearing member and the second bearing member;
a second seal assembly disposed between the second end face of the bushing and the second end portion of the second bearing member; and
third and fourth seal assemblies respectively disposed between the first end portion of the first bearing member and the second bearing member and the second end portion of the first and second collars.

20. An undercarriage assembly comprising:
a track pin defining a longitudinal axis;
a first link assembly and a second link assembly mounted to the track pin such that the first link assembly and the second link assembly are rotatable with respect to each other about the longitudinal axis of the track pin, at least one of the first link assembly and the second link assembly comprising a first member having a load ring engagement surface defining, at least in part, a seal cavity disposed between the first link assembly and the second link assembly; and
a seal assembly, the seal assembly disposed in the seal cavity and sealingly engaging the first link assembly and the second link assembly, the seal assembly comprising:
a seal ring, the seal ring having an axial flange, extending along the longitudinal axis, and a radial flange, extending along a radial axis perpendicular to the longitudinal axis; and
a load ring, the load ring including a seal ring engagement surface, a first member engagement surface, an inner relief surface, and an outer relief surface, the seal ring engagement surface including a radial segment in proximate relationship with the radial flange of the seal ring and an axial segment in proximate relationship with the axial flange of the seal ring, the first member engagement surface engaging the load ring engagement surface of the first member, the first member engagement surface including a radial segment and an axial segment, the radial segment of the first member engagement surface being in distal relationship with the radial segment of the seal ring engagement surface, the inner relief surface extending between the radial segment of the first member engagement surface and the axial segment of the seal ring engagement surface and having an inclined segment, and the outer relief surface extending between the axial segment of the first member engagement surface and the radial segment of the seal ring engagement surface and having an inclined segment;
wherein when the load ring is in an uncompressed condition, the inclined segment of the inner relief surface is disposed at an oblique angle with respect to the longitudinal axis, the inclined segment of the outer relief surface is disposed at an oblique angle with respect to the longitudinal axis, and the radial segment of the first member engagement surface is radially offset, measured along the radial axis, from the radial segment of the seal ring engagement surface.

* * * * *

UNITED STATES PATENT AND TRADEMARK OFFICE
CERTIFICATE OF CORRECTION

Page 1 of 1

PATENT NO.         : 8,985,590 B2
APPLICATION NO.    : 13/451195
DATED              : March 24, 2015
INVENTOR(S)        : Liang et al.

It is certified that error appears in the above-identified patent and that said Letters Patent is hereby corrected as shown below:

Title page Item 73 (Assignee), line 1, delete "Caterpillar," and insert -- Caterpillar Inc., --.

Specification

Column 7, line 12, delete "138" and insert -- 138. --.

Column 10, line 16, delete "etc" and insert -- etc. --.

Column 12, line 56, delete "228" and insert -- 228. --.

Claims

Column 19, line 44, In claim 17, delete "resect" and insert -- respect --.

Signed and Sealed this
Eighth Day of March, 2016

Michelle K. Lee
*Director of the United States Patent and Trademark Office*